Dec. 12, 1961     J. F. MANTING     3,012,797
HITCH GUARD
Filed July 11, 1960
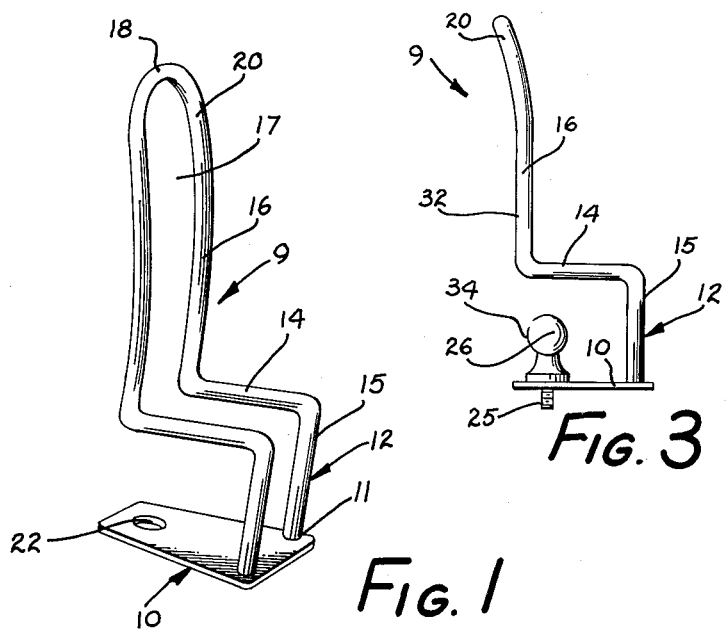
FIG. 1
FIG. 3
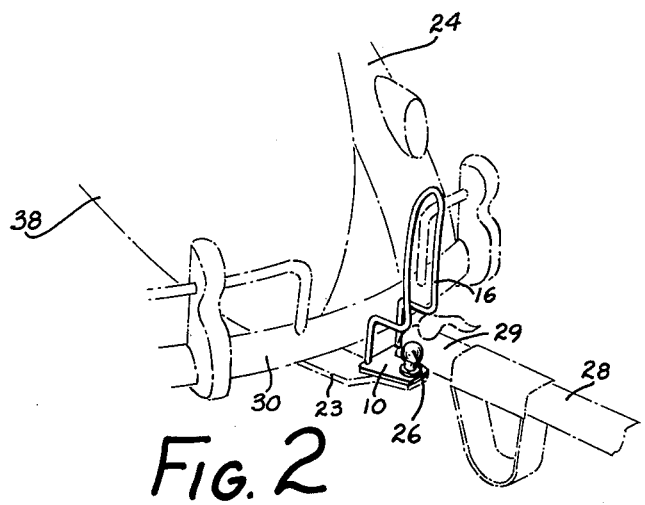
FIG. 2
INVENTOR
JACK F. MANTING
BY *Price and Heneveld*
ATTORNEYS United States Patent Office 3,012,797
Patented Dec. 12, 1961

3,012,797
HITCH GUARD
Jack F. Manting, Big Rapids, Mich., assignor to Manting Tool & Die Company, Morley, Mich., a corporation of Michigan
Filed July 11, 1960, Ser. No. 42,054
6 Claims. (Cl. 280—507)

This invention relates to automobiles and more partiuclarly to a guard attachment for an automobile trailer hitch.

The use of ball type hitch couplers to tow vehicles behind automobiles is very common, but equally common are the irritations associated with such ball couplers on automobiles when not in towing use. The projection of the ball on a platform extending rearwardly of the bumper is necessary for towing but this factor raises difficulties when the bumpers of other vehicles come into contact wtih the rear portion of the subject vehicle. Thus, it frequently occurs that while parking a vehicle or while such a vehicle is being pushed, the bumper of the automobile behind rides over and locks with the hitch ball on the car in front. This action is facilitated by the mutually receding convex surfaces on the upper portion of the ball and the lower portion of the contacting bumper of the second vehicle. Also the exposed ball and its related mounting frequently indent, scratch and otherwise mar the bumper of other cars because of the small area of actual contact.

This condition has been especially aggravated with the advent of compact automobiles which necessarily have lower rear bumpers and hitches.

Then too, the projecting ball and platform have caused many a bruised shin on passers-by.

It is therefore an object of this invention to prevent locking of automobile bumpers over trailer hitch ball couplers.

A still further object is to prevent deformation of a rear bumper so that the lid of the trunk compartment, or on some compact cars, the lid of the engine compartment will not be prevented from opening.

It is an object to accomplish the foregoing objects by providing a guard device for the ball hitch.

More particularly, it is an object to provide a readily mountable and demountable guard for the ball hitch which does not interfere with the usual attachment and removability of the cup portion of the ball joint hitch. Further, this invention provides such a hitch which will not interfere with the operation of the hitch when a trailer is being towed.

Other objects will become apparent to those having ordinary skill in the art upon reading the following specification in conjunction with the accompanying drawings.

In the drawings:

FIG. 1 is a perspective view of the hitch guard showing its unique shape;

FIG. 2 is a perspective view of the guard as installed on an automobile hitch;

FIG. 3 is a side elevation of the guard showing its basic configuration with respect to the protected ball.

Referring in detail to FIG. 1, the numeral 9 indicates the guard which has a base 10 for supporting the upstanding bracket 12. The base 10 is generally flat. The upstanding bracket 12 is fixedly joined to the base at 11, such joinder being by any of several well-known expedients, as for example, welding.

The upstanding bracket 12 has a lower vertical portion 15, a rearwardly extending sector 14 and an upper vertical portion 16. The upper vertical portion 16 terminates in an integral crosspiece 18 which in the illustrated embodiment is a rounded loop. Optionally, the upper portion 16 may be inclined toward the rear, as shown at 20 (FIG. 1). Orifice 22 serves to provide attachment to the automobile hitch in a very convenient manner as explained hereinafter.

Referring to FIG. 2, the guard is shown mounted on the hitch frame 23 of a compact automobile 24. The frame 23 is of the conventional centrally positioned type which is fixedly attached to the automobile. The base 10 is anchored to the platform 23 between the ball and the platform by fastening the usual ball stud 25 through the orifice 22.

The trailer tongue 28 carrying the cup portion 29 of the coupler may be freely coupled onto and removed from the ball 26 due to the clearance provided between the bracket 10 and the ball 26.

FIG. 3 shows the special relationship of the ball and the bracket 12. It is one important feature of this invention that the rear contacting surface 32 of the guard 16 be either approximately in the same plane as the rearmost surface 34 of ball 26 or preferably slightly to the rear of surface 34 to prevent the curved surface of the bumper of another vehicle from sliding over the ball and locking thereon.

In operation the guard is attached to the hitch 23 by stud 25 which simultaneously secures the ball 26. The trailer tongue may be attached and removed from the ball at will without interference from the guard member. Further, when the hitch ball is not in use for towing, the bumper of another automobile may contact the rear of the subject automobile with considerable force without locking of the bumper of the rear automobile over the ball. Also, it will not ride up over the ball or the bumper into the lid 38 of the vehicle, thereby crushing it. It will also prevent buckling of the bumper 30 so as to prevent opening of the lid 38. This protection is afforded by the guard acting as a strong but resilient deflecting and abutment surface. Further protection is provided by the slight rearward canting of the terminal sector of vertical section 16 as shown in FIGS. 1 and 2, since this prevents any tendency of another automobile to ride up over the top of the guard unit.

In addition to its utilitarian purposes, this guard or bumper unit may also impart esthetic value to an otherwise distracting trailer hitch, especially if its appearance is enhanced by chrome plating.

Also, where the hitch frame is attached directly to the supporting members of the vehicle, the stresses applied to the guard will be transferred directly to these stable members rather than to the bumper since the guard is affixed to the hitch frame. Of course, the guard may also be used with conventional bumper hitches.

Certain obvious modifications may be made on the guard shown and described without departing from the spirit of the invention. These are intended to be within the scope of the present invention, such invention being limited only by the attached claims.

I claim:

1. A guard for the rearward end of a trailer hitch equipped with a ball comprising: a base element, a pair of upstanding, laterally spaced members, said members being affixed to said base forwardly of said ball and having rearwardly offset upper portions substantially in the plane of the rear face of said ball.

2. A guard for the rearward end of a trailer hitch equipped with a ball comprising: a base element, an upstanding member, said member being affixed to said base forwardly of said ball and having a rearwardly offset upper portion substantially in the plane of the rear face of said ball.

3. A guard for the rearward end of a trailer hitch equipped with a ball comprising: a base element; an upstanding loop member affixed to said base forwardly of said ball; said loop having an upper generally vertical portion and a lower generally vertical portion; said upper and lower portions being joined by a generally horizontal portion; said upper vertical portion being substantially in the plane of the rear face of said ball; said loop member being spaced from all faces of said ball.

4. A protective apparatus for a ball joint trailer hitch comprising a horizontal base member, said base member defining a vertical orifice therethrough, a ball joint on said base, said ball joint having a connecting bolt, said bolt extending through said orifice in said base, a guard member extending generally vertically from said base and fixedly attached thereto, said guard member being attached to said base on one side of said ball, said guard having a portion extending over said ball, and a further portion extending generally vertically on the opposite side of said ball.

5. The apparatus in claim 4 wherein said guard member comprises two parallel, laterally spaced members which define an opening therebetween.

6. The apparatus in claim 4 wherein the vertically extending portion of said guard member on the opposite side of said ball is canted toward said opposite side.

References Cited in the file of this patent
UNITED STATES PATENTS

| | | |
|---|---|---|
| 2,151,920 | Jandus et al. | Mar. 28, 1939 |
| 2,464,423 | Walkowiak | Mar. 15, 1949 |
| 2,601,993 | McCall | July 1, 1952 |
| 2,671,675 | Swaisgood | Mar. 9, 1954 |